3,539,473
METHOD FOR THE PREPARATION OF FOAMED
SHEET AND PRODUCT OBTAINED THEREBY
Donald W. Simpson, Auburn, and John Y. Glass, Midland, Mich., assignors to The Dow Chemical Company, Midland, Mich., a corporation of Delaware
Filed Sept. 21, 1967, Ser. No. 669,649
Int. Cl. C08d 13/10; C08f 47/10; C08j 1/26
U.S. Cl. 260—2.5                                11 Claims

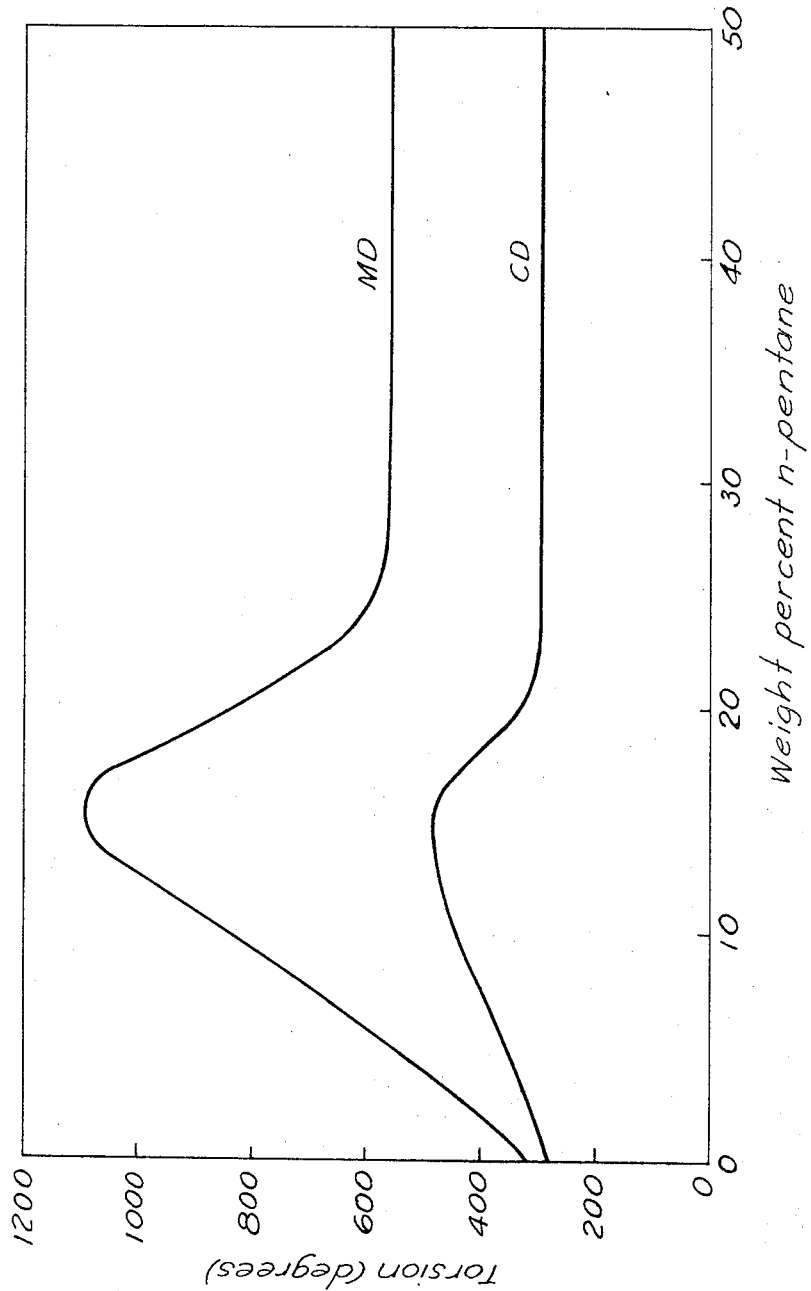

ABSTRACT OF THE DISCLOSURE

Improved polystyrene foamed sheet is obtained by employing as a blowing agent a mixture of about 85 weight percent Freon-12 and about 15 weight percent n-pentane. The foamed sheet is resistant to cracking and shows excellent aging characteristics.

---

This invention relates to the preparation of alkenyl aromatic resinous foamed sheet and a product obtained thereby, and more particularly relates to an improved method for the preparation of foamed alkenyl aromatic resinous sheet particularly suited for packaging applications.

Many techniques are employed to produce thin alkenyl aromatic resinous foamed sheet. These techniques include the extrusion of the foamable granules admixed with various blowing and nucleating agents, subsequent extrusion of the heat plastified mixture in the form of a tube, the tube is subsequently stretched, cooled and split to provide a sheet which is then employed for packaging processes either as a flat sheet or formed by a heat fabrication technique such as vacuum forming to provide a desired shaped article. Such foamed sheet is also prepared by a generally similar process wherein the alkenyl aromatic resin is admixed with a nucleating or cell promoting agent, heat plastified in an extruder and a predetermined quantity of blowing agent added to the melt and admixed therewith in the extruder and the melt extruded in the form of a tube, stretched over a mandrel, cooled and split to provide a flat foamed resinous sheet. The latter method, wherein the blowing agent is admixed within the extruder, is particularly advantageous in that the blowing agent level can be carefully controlled and scrap product can be recycled without adverse effect on the final product. Such foamed sheets vary in thickness from about 5 mils to 200 mils and frequently are applied for packaging applications of relatively heavy objects where a thickness of about 100 mils is desirable. In order to be effective for packaging of relatively heavy objects, the sheet must be relatively flexible, resistant to impact and not become brittle with age within its required useful life. One particularly critical application for such foam is in the preparation of apple trays wherein a foamed sheet is vacuum formed to provide a plurality of indentations, each indentation adapted to receive an apple. Such foamed sheet trays are oftentimes placed within a shipping box, the tray filled with a layer of apples, a second tray placed within the box, a further layer of apples deposited, a third tray and a third layer of apples, and further layers until the box is full. The foam plastic trays, during shipping, prevent bruising of the applies and provide a much more saleable product than is obtained when the foam trays or separators are not employed. The application of foam sheet to apples is merely illustrative. Other objects lending themselves to such a packaging technique include eggs, peaches, ball bearings, vacuum tubes, precision machine parts and the like. Oftentimes in shipping, containers are subject to impact or shock loading which places the packaging material such as a shaped foam container tray or protector under stresses which may cause rupture of the foam. Obviously, it is desirable to provide a packaging material having optimum physical properties and minimum weight.

Therefore, it is highly desirable to improve the physical characteristics of a foamed sheet of a given density without significantly increasing the amount of material therein.

It is also desirable to provide foamed sheet which does not rapidly become brittle upon aging.

It is also highly desirable to provide a relatively flexible sheet having an attractive, fine celled structure.

These benefits and other advantages in accordance with the present invention are obtained in a method for the preparation of a cellular plastic article comprising extruding a thermoplastic resinous polymer and a monovinyl aromatic compound of the benzene series wherein the polymeric resin comprises in chemically combined form at least 90 weight percent of at least one monovinyl aromatic compound of the formula Ar—CH=CH$_2$ wherein Ar is an aromatic hydrocarbon radical of the benzene series or an aromatic halohydrocarbon of the benzene series with up to 10 weight percent of another readily copolymerizable olefinic compound, a nucleating agent and a volatile foaming agent, heating the plastic composition to a temperature sufficient to cause foaming and extruding said composition into a region of lower pressure to permit formation of a plurality of fine cells within the extruded body, the improvement which comprises employing as a foaming agent a mixture comprising from 75 to 97.5 weight percent dichlorodifluoromethane and from about 25 to 2.5 weight percent pentane selected from the group consisting of n-pentane, isopentane and mixtures thereof.

Also contemplated within the scope of the present invention is a cellular plastic article comprising a thin plastic resinous oriented foamed sheet wherein the sheet contains a major portion of a polymer consisting of thermoplastic resinous polymers of monovinyl aromatic compounds of the benzene series wherein the polymeric resin comprises in chemically combined form at least 90 weight percent of at least one monovinyl aromatic compound of the formula Ar—CH=CH$_2$ wherein Ar is an aromatic hydrocarbon radical of the benzene series or an aromatic halohydrocarbon radical of the benzene series with up to 10 weight percent of another readily copolymerizable olefinic compound, a nucleating agent and a foaming agent, the foamed sheet comprising a plurality of closed cells, the cells containing a mixture consisting essentially of from 75 to 97.5 weight percent dichlorodifluoromethane and from 25 to 2.5 weight percent of pentane selected from the group consisting of n-pentane, isopentane and mixtures thereof.

The method is advantageously employed for making cellular articles from alkenyl aromatic resins such as the thermoplastic resinous polymers and copolymers of one or more monovinyl aromatic compounds of the benzene series wherein the polymeric resin comprises in chemically combined form at least 90 percent by weight of at least one monovinyl aromatic compound having the general formula Ar—CH=CH$_2$ wherein Ar represents an aromatic hydrocarbon radical or an aromatic halohydrocarbon radical of the benzene series. Examples of such alkenyl aromatic resins are the solid homopolymers of styrene, vinyltoluene, vinylxylene, ar-ethylvinylbenzene, isopropylstyrene, tert.-butylstyrene, ar-chlorostyrene, ar-dichlorostyrene, ar-fluorostyrene, ar-bromostyrene; the solid copolymers of two or more of such monovinyl aromatic compounds and said copolymers of one or more of such monovinyl aromatic compounds and minor amounts, e.g. from 1 to 10 percent by weight of other readily copolymerizable olefinic compounds such as acrylonitrile, methyl methacrylate or ethyl acrylate.

The fluid foaming agent suitable for use in the present invention comprises a mixture of from about 2.5 to 25 weight percent n-pentane, isopentane or mixtures thereof with from about 75 to 97.5 weight percent dichlorodifluoromethane. An advantageous pentane content is from about 6.5 to 22.5 weight percent, the remainder being dichlorodifluoromethane. A mixture containing 7.5 to 20 weight percent pentane with the remainder being dichlorodifluoromethane is most advantageously employed. The fluid foaming agent is usually employed in a range of from about 5 to about 12 parts by weight per hundred parts of the polymer. The pentane employed for the practice of the invention should contain a minimum of 90 percent by weight of pentane having vapor pressure as measured at 100° F. of 14 to 23 pounds per square inch absolute; as impurities, primarily aliphatic hydrocarbons of C$_4$, C$_5$ or C$_6$. The dichlorodifluoromethane should contain at least 90 weight percent of dichlorodifluoromethane and have a vapor pressure measured at 70° F. of 75 to 92 pounds per square inch absolute; the remaining constituents being fluorocarbons, chlorofluorocarbons and fluorochlorohydrocarbons, such as dichloromethane, chlorodifluoromethane and the like; the fluid foaming agent being generally a non-solvent for the polymers.

A variety of nucleating agents may be employed including gas releasing combinations such as are set forth in British patent specification 854,586 and advantageously, organic polymeric nucleating agents are employed such as are disclosed in U.S. Letters Patent 3,231,524.

The extrudable composition may be prepared by admixing a suitable granular resin with a nucleating agent, heat plastifying within an extruder, adding the fluid foaming agent to the heat plastified material in the extruder and employing the extruder to admix the blowing agent with the heat plastified gel, or alternately and less beneficially, the fluid foaming agent may be incorporated within the granular particles either during polymerization or by the steeping-in process, both techniques being well known in the art, and subsequently the mixture passed to an extruder. It is particularly advantageous to add a fluid foaming agent to the heat plastified material in the extruder in accordance with the procedure set forth in U.S. Letters Patent 3,231,524, in order that the scrap may be recycled. Extrusion conditions useful in the practice of the present invention are somewhat dissimilar to those utilized in the extrusion of conventional solid polystyrene. The temperature of the cylinder or heating zone of the extruder is usually maintained from 145° to 150° C. and the gel temperature prior to issuing from the orifice is usually maintained at a temperature of about 130° to 140° C. when polystyrene is employed. Various techniques for extruding such foam sheet are well known in the art and are set forth in U.S. Letters Patents 2,917,217; 3,094,449; 3,121,911; 3,151,192; 3,194,864 and 3,311,681.

As foamed sheet is employed in packaging applications usually in one of two ways: in an unformed condition, that is, the flat sheets are employed as spacers or overwrap or a partial overwrap, or the sheets are subsequently reheated and formed frequently by pressure processes, such as vacuum forming, plug assist, pressure vacuum forming and the like, evaluation of the product by means other than testing the actual application has at times been somewhat difficult. However, for many purposes, the packaging qualities of a flat sheet are indicated by a torsional failure test which, in effect, provides a measure of the flexibility value of the product for both the hot formed sheet and cold formed sheet. One particularly beneficial torsional test comprises severing from the extruded sheet a plurality of samples measuring 6 inches in length and 1 inch in width. Some of the samples are cut with the maximum dimension in the machine direction (MD) of extrusion and some of the samples being cut with the maximum dimension in the cross direction (CD). The ends of the 6 inch by 1 inch samples are clamped one end in a fixed jaw and the other end in a rotatable jaw. The rotatable jaw is then rotated at one revolution per minute until the sample fails by breaking or folding. Several of the 6 inch by 1 inch samples are so evaluated and assigned a torsion value which is the number of degrees of rotation of the rotatable jaw before failure. The lowest value obtained from the number of test specimens is then taken as a flexibility value. Advantageously, in performing such a torsion test the rotatable jaw is affixed to the shaft of a one revolution per minute gearhead synchronous motor.

A particularly advantageous and beneficial test for the suitability of foam sheet as a packaging material for shipping is a test referred to as a drop box test. The foamed sheet is vacuum formed into a plurality of apple trays having product receiving cavities therein. A corrugated paper box measuring 20 inches in length, 12 inches in width and 12 inches in depth is filled with formed apple trays, each tray being filled wtih apples. The box is closed and subsequently dropped a distance of 18 inches to land squarely on its bottom. The box is then opened; the four uppermost trays removed and the total number of lineal inches of cracking appearing in the four uppermost trays is taken as a measurement or rating of the performance of the foamed sheet as a packaging material. If the four trays have a combined crack length value of 40 inches, the foamed sheet is considered unsuitable for the application and a value of 40 inches is given to any combination of trays having total inches of cracking exceeding 40 inches. No measurement is made on the bottom tray as it is rare to observe failure of the bottom tray.

The invention is further illustrated but not limited by the following examples:

EXAMPLE 1

A plurality of foamed sheet samples are prepared employing granular polystyrene. A 10 weight percent solution of the polystyrene in toluene has a viscosity of about 34 centipoises at 25° C. A nucleating agent is admixed with the granular polystyrene. The nucleating agent is a copolymer of 67 parts by weight styrene and 33 parts by weight of maleic anhydride. A solution of the polystyrene-maleic anhydride polymer in methyl ethyl ketone at 25° C. has a viscosity of about 0.7 centipoise. The granular polystyrene and nucleator are admixed and fed to a 6 inch extruder with a screw and a 20:1 length to diameter ratio and a cooling section generally as depicted in U.S. Letters Patent 2,669,751. The extruder is fitted with a die having an annular opening of 2.5 inches outside diameter and 0.125 inch opening. The extruded tube is stretched over a mandrel and air pressure applied to the space enclosed by the die, tube and mandrel providing air lubrication. About 10 weight percent of the extrude is recycled by grinding and admixing with the granular polystyrene and nucleator. The blowing agent is introduced into the heat plastified mass within the extruder barrel. The results are plotted and shown in the accompanying figure. The numbers along the abscissa represent weight percent of pentane in a mixture of pentane and dichlorodifluoromethane. The figures along the ordinate represent the torsional value in degrees. The conditions and test results are set forth in Table I.

TABLE I

| Sample No. | Polymer lb/hr. | Blowing agent ratio by wt. F12/nC5 [1] | Blowing agent, lbs./hr | Nucleator, lbs./hr. | Die pressure, p.s.i.g. | Gel temp., °C.[2] | Blowup ratio[3] | Gauge, mils | Density, lbs./ft.³ | Avg. cell size, mm. | Orientation[4] 135° C. MD/CD[5] | Torsion (degrees) MD/CD |
|---|---|---|---|---|---|---|---|---|---|---|---|---|
| 1 | 245 | 100/0 | 22 | 4.2 | 710 | 136 | 4.1 | 93 | 5.0 | .10 | 21/64 | 304/280 |
| 2 | 246 | 95/5 | 24 | 4.7 | 625 | 133 | 4.1 | 110 | 4.1 | .17 | 22/60 | 632/394 |
| 3 | 244 | 90/10 | 23.4 | 2.9 | 700 | 133 | 4.1 | 100 | 4.9 | .12 | 24/63 | 732/359 |
| 4 | 242 | 85/15 | 22 | 2.4 | 690 | 129 | 4.1 | 109 | 4.3 | .20 | 23/62 | 1104/497 |
| 5 | 250 | 80/20 | 20 | 4.5 | 1050 | 130 | 4.1 | 105 | 5.9 | .11 | 29/66 | 800/310 |
| 6 | 242 | 50/50 | 20 | 2.4 | 800 | 136 | 4.1 | 113 | 3.9 | .15 | 27/60 | 599/331 |

[1] Freon-12 (dichlorodifluoromethane)/n-pentane.
[2] Temperature of gel adjacent die prior to extrusion.
[3] Ratio of final width to die opening circumference.
[4] The numbers in the orientation column are the dimensions in tenths of an inch of a 10 inch by 10 inch sample of foam sheet which was immersed in a glycol bath at 135° C. for 5 minutes and subsequently cooled to room temperature.
[5] Machine Direction/Cross Direction.

EXAMPLE 2

The procedure of Example 1 is repeated employing a 4.5 inch extruder with a 20:1 length to diameter ratio and a 3 inch die substantially as shown in U.S. Pat. 2,669,751. The results are set forth in Table II.

TABLE II

| Sample No. | Polymer lbs./hr. | Blowing agent ratio by wt. F12/nC5 [1] | Blowing agent, lbs./hr. | Nucleator, lbs./hr. | Recycle polymer, lbs./hr. | Die pressure, p.s.i.g. | Gel temp., °C. | Gauge, mils | Sheet weight gms./100″ [2] | Avg. cell size, mm. | Orientation 135° C. MD/CD[2] | Torsion (deg.) MD/CD[2] | Blow-up ratio |
|---|---|---|---|---|---|---|---|---|---|---|---|---|---|
| 7 | 380 | 100/0 | 33 | 5 | | 900 | 142 | 110 | 9.6 | .08 | 21/54 | 316/405 | 3.2 |
| 8 | 120 | 79/21 | 34 | 5 | 330 | 950 | 139 | 103 | 10.1 | .08 | 32/68 | 367/387 | 3.2 |
| 9 | 120 | 79/21 | 34 | 5 | 330 | 850 | 139 | 107 | 10.5 | .06 | 28/65 | 345/424 | 3.0 |
| 10 | 120 | 0/100 | 28 | 5 | 330 | 700 | 130 | [3] 56 | 10.3 | .06 | 24/53 | 284/350 | 3.0 |

[1] Freon-12 (dichlorodifluoromethane)/n-pentane.
[2] Machine Direction/Cross Direction.
[3] Sheet compressed by pull rolls.

The sheet is subsequently formed into a plurality of apple trays and subjected to the drop box test previously described. Two weeks after forming, the trays are subjected to the drop box test: Sample No. 7 shows 15 inches of cracking; Sample No. 8 shows 14 inches of cracking; Sample No. 9 shows 2 inches of cracking and Sample No. 10 shows 102 inches of cracking. Six weeks after forming, the trays are subjected to the drop box test: Sample No. 7 shows 16 inches of cracking; Sample No. 8 shows 14 inches of cracking; Sample No. 9 shows 7 inches of cracking and Sample No. 10 shows 160 inches of cracking. Sixteen weeks after forming, the trays are subjected to the drop box test: Sample No. 7 shows 62 inches of cracking; Sample No. 8 shows 22 inches of cracking; Sample No. 9 shows no cracking and Sample No. 10 shows total failure of the trays, cracking in excess of 160 inches.

Similar beneficial and advantageous results are also obtained when other alkenyl aromatic resinous polymers hereinbefore described are employed and when isopentane and a 1:1 mixture of n-pentane and isopentane is substituted for n-pentane of the previous illustrations.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of a cellular plastic article comprising
    extruding a thermoplastic resinous polymer of a monovinyl aromatic compound of the benzene series wherein the polymeric resin comprises in chemically combined form at least 90 weight percent of at least one monovinyl aromatic compound of the formula Ar—CH=CH$_2$ wherein Ar is an aromatic hydrocarbon radical of the benzene series or an aromatic halohydrocarbon of the benzene series with up to 10 weight percent of another readily copolymerizable olefinic compound, a nucleating agent and a volatile foaming agent,
    heating the plastic composition to a temperature sufficient to cause foaming and
    extruding said composition into a region of lower pressure to permit formation of a plurality of fine cells within the extruded body, the improvement which comprises
    employing as a foaming agent a mixture comprising from 75 to 97.5 weight percent dichlorodifluoromethane and from about 25 to 2.5 weight percent pentane selected from the group consisting of n-pentane and isopentane.

2. The method of claim 1 wherein the thermoplastic resinous polymer is polystyrene.

3. The method of claim 2 wherein the foaming agent is from 6.5 to 22.5 weight percent pentane, the remainder being dichlorodifluoromethane.

4. The method of claim 3 wherein the foaming agent is from 7.5 to 2 weight percent pentane with the remainder being dichlorofluoromethane.

5. The method of claim 1 wherein the pentane is n-pentane.

6. In a cellular plastic article comprising a thin plastic resinous oriented foamed sheet wherein the sheet contains a major portion of a polymer consisting of thermoplastic resinous polymers of monovinyl aromatic compounds of the benzene series wherein the polymeric resin comprises in chemically combined form at least 90 weight percent of at least one monovinyl aromatic compound of the formula Ar—CH=CH$_2$ wherein Ar is an aromatic hydrocarbon radical of the benzene series or an aromatic halohydrocarbon radical of the benzene series with up to 10 weight percent of another readily copolymerizable olefinic compound, a nucleating agent and a foaming agent, the foamed sheet comprising a plurality of closed cells, the improvement comprising the cells containing a foaming agent mixture consisting essentially of from about 75 to about 97.5 weight percent dichlorodifluoromethane and from about 25 to about 2.5 weight percent of pentane, selected from the group consisting of n-pentane and isopentane.

7. The sheet of claim 6 wherein the thermoplastic resinous polymer is polystyrene.

8. The sheet of claim 7 wherein the foaming agent comprises 6.5 to 22.5 weight percent pentane, the remainder being dichlorofluromethane.

9. The sheet of claim 8 wherein the foaming agent comprises 7.5 to 20 weight percent pentane with the remainder being dichlorofluoromethane.

10. The sheet of claim 6 wherein the sheet defines at least one product receiving cavity.

11. The sheet of claim 6 wherein the pentane is n-pentane.

References Cited

UNITED STATES PATENTS

| | | | |
|---|---|---|---|
| 2,848,428 | 8/1958 | Rubens | 260—2.5 |
| 2,884,386 | 4/1959 | McMillan et al. | 260—2.5 |
| 3,066,106 | 11/1962 | McMillan et al. | 260—2.5 |
| 3,121,130 | 2/1964 | Lightner | 260—2.5 |
| 3,121,911 | 2/1964 | Willey et al. | 260—2.5 |

MURRAY TILLMAN, Primary Examiner

M. FOELAK, Assistant Examiner

U.S. Cl. X.R.

264—53

PO-1050
(5/69)

UNITED STATES PATENT OFFICE
CERTIFICATE OF CORRECTION

Patent No. 3,539,473          Dated  10 November 1970

Inventor(s)   Donald W. Simpson and John Y. Glass

It is certified that error appears in the above-identified patent and that said Letters Patent are hereby corrected as shown below:

In column 6, line 46, change "2 weight" to -- 20 weight --; in line 47 delete "dichlorofluoromethane" and insert -- dichlorodifluoromethane --; in line 74 delete "dichlorofluromethane" and insert -- dichlorodifluromethane -- .

In column 7, line 2, delete "dichlorofluoromethane" and insert -- dichlorodifluoromethane --.

Signed and sealed this 23rd day of March 1971.

(SEAL)
Attest:

EDWARD M. FLETCHER, JR.
Attesting Officer

WILLIAM E. SCHUYLER, JR.
Commissioner of Patents